3,255,238
OXIDATION OF OLEFINES TO SATURATED ALDE-
HYDES, KETONES, ACIDS AND ESTERS WITH A
MOLYBDENUM OXIDE-BORIC ACID-PHOS-
PHORIC ACID CATALYST
Otto Roelen, Oberhausen-Holten, and Walter Rottig,
Oberhausen-Sterkrade-Nord, Germany, assignors to
Ruhrchemie Aktiengesellschaft, Oberhausen-Holten,
Germany, a corporation of Germany
No Drawing. Filed Aug. 3, 1962, Ser. No. 214,521
Claims priority, application Germany, Aug. 5, 1961,
R 30,885
11 Claims. (Cl. 260—497)

This invention relates to catalytic oxidation of aliphatic olefins and has for its object the provision of a process permitting selection with respect to the products of the oxidation.

It is known that acrolein can be produced by catalytic oxidation of aliphatic olefins such as propylene in the presence of oxygen. The reaction is effected at temperatures in the range between about 200° and 500° C. with the use of atmospheric pressure or superatmospheric pressure. The catalysts are selected from a great number of heavy metal oxides used alone or in mixture with one another, examples of suitable heavy metal oxides being copper oxide, silver oxide, chromium oxide, bismuth oxide, tungsten oxide, molybdenum oxide, etc. The reaction products obtained are mainly acrolein and small amounts of acetaldehyde. A process for the production of oxidation products as referred to here is disclosed in our co-pending application Serial No. 142,462, filed June 29, 1961.

It has been found that the catalytic oxidation of low molecular weight aliphatic olefins by contacting with oxygen at elevated temperatures can be carried out in a manner to provide as oxidation products materials which are saturated, if the catalyst is formed of heavy metal oxides as have been used heretofore (see above) and phosphoric acid and boric acid. The products of the oxidation according to the invention can be saturated aldehydes, acids and esters.

Thus, the invention provides a process for oxidation of lower aliphatic olefins which comprises contacting lower aliphatic olefins with oxygen in the presence of a catalyst comprising a heavy metal oxide for oxidation of olefins and phosphoric acid and boric acid. The contacting is for oxidation of the olefins, and by this process, substantial amounts of saturated oxidation products are formed. The catalyst can be formed by a catalyst support bearing heavy metal oxide and phosphoric acid and boric acid activated while contained on the support by heating to above about 150° C.

As well as a process for oxidation, the invention provides a novel catalyst. The catalyst consists essentially of heavy metal oxide for oxidation of olefins and phosphoric acid and boric acid deposited on a catalyst support. The amount of phosphoric acid and boric acid is about 1–25% of the total catalyst and the mol proportion of boric acid to phosphoric acid is in the range of about 5:1 to 1:5.

The catalyst can be produced by depositing phosphoric acid and boric acid on a catalyst support, and thereafter depositing on the support heavy metal oxide for oxidation of olefins.

It has been found in experiments that the combination of phosphoric acid and boric acid, or boryl phosphate, in contrast to the use of phosphoric acid alone or boric acid alone, has the effect of suppressing substantially completely oxidation at the methyl group and of causing extensive oxidation at the double bond, e.g., of propylene. Consequently, acrolein is hardly found in the reaction products of the oxidation while formaldehyde, acetaldehyde, acetic acid and acetic ester are now obtained as the preferred reaction products.

Relatively small amounts of boric acid and phosphoric acid are sufficient to obtain the effect desired. For example, about 1% of the acid mixture in the catalyst is completely sufficient to achieve the alteration of the catalytic characteristics mentioned above. Lesser amounts can be used. Also larger amounts can be used. The amount can be up to about 25% and preferably amounts of between 1.5% and 15%, based on total catalyst, are used. Total catalyst means catalyst inclusive carrier.

The molar ratio of boric acid to phosphoric acid may be varied between about 5:1 and 1:5. It is favorable if the molar amounts are not greatly different, e.g., 2.5:1 to 1:2.5, or 2.5:1 to 1:1. A particularly favorable composition is obtained when the molar ratio is about 1:1.

As has been indicated above, the heavy metal oxide can be a heavy metal oxide or a mixture of heavy metal oxides as are known for the oxidation of olefins to produce compounds such as acrolein. Thus, the heavy metal oxide can be an oxide of silver, copper, chromium, tungsten, molydbenum, mismuth, or a mixture of two or more of these oxides.

The preferred heavy metal oxide is a mixture of molybdenum oxide and bismuth oxide. In such a mixture, the mol proportion of molybdenum oxide to bismuth oxide shall be about 1:3–1:0.3.

The catalysts of the invention are preferably contained on a catalyst support. Various materials are known for service as catalyst supports, and, in general such materials are suitable for the purposes of the invention. The preferred material for use as a support is silica. Desirably, the silica is fume silica of the type disclosed for use as a carrier support in our co-pending application Serial No. 104,814, filed April 24, 1961, and now abandoned.

The acids and the heavy metal oxides may be applied to the support by soaking, spraying, precipitation, etc. It is possible to add the acids and oxides simultaneously or in succession. Catalysts having satisfactory properties are obtained in any case. However, the order of addition is of some importance in view of the optimum characteristics of the catalyst. Preferably the phosphoric acid and boric acid are applied first.

The amounts desired of boric acid and phosphoric acid can be applied to the support from an aqueous solution by soaking, spraying, or evaporation, with two acids being incorporated in succession, simultaneously, or in stepwise fashion wherein portions of each are applied alternately. Another acid, such as dilute nitric acid, may be added to the aqueous solution of acids in small amounts.

This treatment is effected at a temperature ranging between room temperature and 100° C. The water should be evaporated extensively, if necessary to dryness, before the heavy metal oxides are added.

The application of the boric acid-phosphoric acid mixture to the support is followed by soaking with the heavy metal oxide or oxides desired. This is likewise preferably effected by use of an aqueous medium. The corresponding salts can be dissolved in water, and small amounts of, for example, nitric acid can be added. Good results are readily obtained if molybdic acid, e.g., in the form of ammonium molybdate, is used as the only heavy metal oxide for the catalyst. An improvement in selectivity which, however, is accompanied by some increase in reaction temperature, can be obtained by adding certain amounts of bismuth oxide, e.g., in the form of bismuth nitrate, to the molybdenum oxide. In this case, satisfactory catalysts are obtained with a molybdenum oxide to bismuth oxide ratio of between about 1:3 and 1:0.3. However, other molar proportions are also applicable.

While ammonium molybdate is the preferred form of molybdic acid, the bismuth compound is preferably used in the form of bismuth nitrates. The compounds or mixtures to be used are dissolved in water, preferably with addition of small amounts of nitric acid, at temperatures of between about room temperature and 100° C., the pretreated carrier material is added and the whole mixture is evaporated to dryness. However, in place of direct soaking, it is possible to apply the solution of heavy metal salts to the carrier material by spraying or to use subatmospheric pressure during evaporation, etc.

One or mixtures of two and more of a great number of other heavy metal compounds such as those of silver, copper, chromium, tungsten, etc. may be used in place of two heavy metal compounds mentioned above. In place of soaking, it is also possible, for example, to deposit precipitates of the corresponding heavy metal salts with alkali metals or acids on the support.

After incorporation of all of the compounds desired in the carrier material and extensive drying or evaporation of the present water in a temperature range between about 50 and 150° C., the catalyst is molded. The molding operation is dependent upon the type of process in which the catalyst is to be used. For example, the simplest catalyst form is produced by granulation of the evaporated dry catalyst cake and recovering the fraction between about 2 and 6 mm. by screening with both oversized and undersized granules being returned to the catalyst preparation step. Other methods of molding the catalyst mass, e.g., the production of pellets with the use of a pellet mill, the production of compressed catalyst particles with the use of a press to prepare cylindrical or lens-shaped granules, can be used.

After molding, and if desired, post-drying preferably effected in a temperature range of 50 to 150° C., the catalyst is preferably activated by thermal aftertreatment at a temperature above about 150° C., preferably in the range between about 150 and 600° C., preferably between 200 and 50° C. The activating treatment is effected for 30 to 300 minutes. If necessary or desired, air or nitrogen is passed over the catalyst during activation to drive off more rapidly any nitrogen oxides which may be present.

After this treatment, the catalyst is ready for the intended use.

The aliphatic olefins subjected to oxidation according to the invention can be low molecular weight aliphatic olefins having from 3–6, preferably 3–4 carbon atoms.

The conditions employed for the oxidation can be conditions as are known for the prior art processes wherein olefins are oxidized using the heavy metal oxides. Preferably, the temperature for the oxidation is about 200–500° C. Elevated pressures can be used. Thus, the pressure can be atmospheric up to about 16 kgs. per cm.$^2$. The preferred pressure is 2–6 kgs. per cm.$^2$.

It is advantageous to add steam to the reaction mixture. It is not necessary that the aliphatic olefin to be reacted be used in pure form. It may contain more, e.g., up to about 70%, of the corresponding saturated hydrocarbon.

The catalytic oxidation may be effected on a once-through basis, in which case conversion rates of as high as about 80% of the olefin charged can be achieved. However, it is preferred to operate with recycling because this permits not only the use of less severe temperature conditions resulting in an increased useful service life of the catalyst, but also results in improved selectivity with increased conversion rates.

The catalyst may be used in the reaction as dust in a fluidized bed or moving bed. However, it is particularly advantageous to arrange the molded, e.g., granulated or pelletized catalyst in long and wide tubes, i.e., tubes of 5 to 15 m. and preferably 10 to 12 m. in length and 20 to 80, and preferably 30 to 50 mm. in inside diameter.

The composition of the reaction products is surprising. For 100 parts of propylene reacted, the product can be, for example:

20 to 40% by weight of formaldehyde,
30 to 50% by weight of acetic acid,
10 to 25% by weight of acetaldehyde, and
10 to 15% by weight of acetic ester.

In addition, small amounts of further organic compounds, and some carbon monoxide and carbon dioxide is produced. The composition of the product will, of course, depend upon the composition of the catalyst and operating conditions.

Example 1

4.2 grams of boric acid (crystallized) and 6 grams of phosphoric acid (7.06 grams of 85% phosphoric acid) were added to 500 ml. of water and the mixture was stirred until the acids were completely dissolved. Then 120 gms. of a $SiO_2$ product known under the trade name of "Aerosil ungepresst" (Aerosil uncompressed) were added in portions. The mixture was finally stirred thoroughly and evaporated to dryness on a water bath. The lumpy cake was subsequently crushed mechanically in a ball mill.

1.8 ml. of concentrated nitric acid, 160 ml. of water and 25.7 gms. of $Bi(NO_3)_3 \cdot 5H_2O$ were heated to about 50° C. until the nitrate was dissolved. Then 11.7 gms. of molybdic acid (85%) were added with stirring. Thereafter the dried Aerosil was added with stirring and the mixture was again evaporated to dryness on a water bath.

The lumpy mass was crushed and the fraction between 1.5 and 4 mm. was recovered by screening. This fraction was calcined for 60 minutes at 300° C. The bulk weight of the finished catalyst was 352 gms./liter.

250 ml. of this catalyst were filled into a quartz tube of 20 mm. in inside diameter so that the length of the bed was about 80 cm. The quartz tube was arranged in an electrically heated furnace which was controlled by means of a contact thermometer. Downstream of the tube was arranged a water-cooled condenser with a receiver followed by two liquid air traps maintained at −70° C.

When 4 normal liters/hr. of propylene (as a 62% propylene-propane mixture) mixed with 50 normal liters/hr. of air (saturated with water vapor at 66° C.) were passed over this catalyst at a temperature of 375° C., 420 gms. of total condensate were obtained per day. Processing of the condensate resulted in 32 gms. of acetic acid, 7 gms. of acetic ester, 11 gms. of formaldehyde, 6 gms. of acetaldehyde. Moreover, 13 gms. of acetone and 2 gms. of acrolein could be found. In addition, certain amounts of carbon dioxide and carbon monoxide had been produced.

Propylene conversion was about 37% while only a minor amount of the propane present was converted.

When a similar catalyst was prepared except that the phosphoric acid was omitted, more than 65% of the reaction products (based on organic compounds produced) consisted of acrolein while the balance comprised acetic acid (10%), acetaldehyde (5%), formaldehyde (15%), and acetic ester (3.5%) as well as several organic compounds. The operating conditions were the same as those used in the preceding experiment.

If the boric acid was omitted in place of phosphoric acid, the proportion of acrolein produced under the same operating conditions increased to 70%, based on organic compounds.

Example 2

A further catalyst was prepared in a manner analogous to that used in Example 1 for the first catalyst except that the bismuth component was omitted. At 320° C., the propylene conversion was already 55%. The organic compounds insulated from the liquid reaction product contained 49% of acetic acid, 6% of acetaldehyde, 17% of formaldehyde, 10% of acetic ester and 12% of acetone (all percentages by weight). Moreover, 3% of acrolein were obtained. The balance comprised different organic compounds. The proportions of carbon dioxide and carbon monoxide obtained in this experiment were higher than those in the preceding experiments.

Example 3

When using a catalyst having the same composition as that of the first catalyst of Example 1, except that the molybdenum component was omitted, a propylene conversion of only 15% was found at 400° C. The product distribution was similar to that obtained with the first catalyst of Example 1.

Example 4

A catalyst was prepared using the same conditions and amounts of constituents as those used for first catalyst of Example 1 except that the Aerosil proportion was varied. The finished catalyst had the following composition:

| | Percent |
|---|---|
| $P_2O_5$ | 7.3 |
| $B_2O_3$ | 4.0 |
| $MoO_3$ | 16.8 |
| $Bi_2O_3$ | 21.0 |
| Aerosil | 50.9 |

4.5 liters of propylene mixed with 55 normal liters of air (saturated with water vapor at 61° C.) were passed over 250 ml. of this catalyst at a temperature of 290° C. A propylene conversion rate of 25% was found at a reaction temperature of 290° C. The organic compounds produced had the following composition:

| | Percent |
|---|---|
| Acetic acid | 40 |
| Formaldehyde | 18 |
| Acetaldehyde | 10 |
| Acetic ester | 12 |
| Acetone | 15 |
| Acrolein | 3 |

The balance comprised various organic compounds. Moreover, certain amounts of carbon dioxide and carbon monoxide were produced.

In the case of another catalyst, an alumina product known under the trade name of "P 110" was used in place of Aerosil while the composition was otherwise unchanged. A propylene conversion of 27% was found at a temperature of as low as 270° C. and the composition of the organic compounds was substantially identical with that of the preceding experiment. However, the proportions of carbon dioxide and carbon monoxide were higher.

If the experiment described above was carried out with double the feed rate of propylene, an increase in temperature by 25° C. was necessary to maintain the conversion rate. The proportion of acetic acid dropped to 37% while that of the remaining organic compounds increased to some extent. The production of carbon dioxide and carbon monoxide was somewhat reduced. When this experiment was carried out in a suitable pressure apparatus (stainless steel tube of 16 mm. inside diameter) under a pressure of 4 kg./sq. cm., the propylene conversion increased to 35%. The production of acetic acid and acetaldehyde dropped to a minor extent while the production of the remaining compounds increased correspondingly.

Example 5

When the first catalyst of Example 1 was produced with half the amount of boric acid and phosphoric acid, activity and product composition remained substantially unchanged under the working conditions described in Example 1. The production of acrolein was slightly higher.

Analogous results were obtained when half the amount of phosphoric acid or boric acid was used. In both cases, the production of acrolein increased slightly. Moreover, the amount of acetic acid decreased by 2–3 grams.

Example 6

A catalyst was prepared under the same conditions and with the same constituents as those used for the first catalyst of Example 1, except that the bismuth nitrate was replaced by the stoichiometrical amount of chromium nitrate (21 gms.). A propylene conversion of 32% was found under the conditions used for the first catalyst of Example 1. Processing of the liquid products including the products obtained in the liquid air traps by distillation resulted in

| | Percent |
|---|---|
| Acetic acid | 51 |
| Acetaldehyde | 5 |
| Formaldehyde | 15 |
| Acetone | 8 |
| Acetic ester | 6 |
| Acrolein | 5 | in addition to small amounts of other organic compounds.

Example 7

A catalyst similar to the first catalyst of Example 1 was prepared as follows: The quantities desired of molybdic acid and bismuth nitrate and 36 ml. of concentrated nitric acid were dissolved in 500 ml. of water. Then a silica product known under the trade name of "Aerosil X 200" was added with stirring and the mixture was evaporated on a water bath. The cake was crushed mechanically, mixed with a solution of boric acid and phosphoric acid in 250 ml. of water and the mixture was again evaporated on the water bath. This was followed by drying for 24 hours at 120° C., crushing, recovering the fraction from 2 to 5 mm. by screening, and calcining for 60 minutes at 300° C.

When 5 liters/hr. of propylene (98%) mixed with 60 normal liters/hr. of air (saturated with water vapor at 75° C.) were passed over 250 ml. of the catalyst at a temperature of 340° C., a propylene conversion of 30% was found. The main product again consisted of

| | Percent |
|---|---|
| Acetic acid | 53 |
| Acetaldehyde | 5 |
| Formaldehyde | 19 |
| Acetic ester | 7 |
| Acetone | 6 |
| Acrolein | 6 | and further organic compounds. Part of the propylene had been oxidized to form $CO_2$ and CO.

Example 8

In accordance with Example 1, a catalyst is prepared having the following composition:

| | Percent |
|---|---|
| $B_2O_3$ | 2.0 |
| $P_2O_5$ | 4.5 |
| $MoO_3$ | 13.4 |
| $Bi_2O_3$ | 20.6 |
| Aerosil (trade name Ox 200) | 59.5 |

The temperature of calcination is 350° C., and time of calcination is 90 minutes.

Using an apparatus corresponding to Example 1, 5.3 normal liters isobutylene (more than 98%) is passed through 250 cm.³ of this catalyst. Simultaneously 65 normal liters of air (saturated by steam at 75° C.) is passed through the catalyst. Reaction temperature is 285° C. Following those operating conditions, a conversion of 37% isobutylene has been found.

In working up the whole of condensed products there were found:

| | G. |
|---|---|
| Acetic acid and acrylic acid | 80 |
| Ethylacetate | 15 |
| Formaldehyde | 17 |
| Acetaldehyde | 11 |

Apart from these compounds there was 10 g. acetone and small quantities of methyl acrolein in the product.

A certain portion of reacted isobutylene has been oxidized to carbon dioxide and carbon monoxide.

The percentages and "parts" set forth herein are on a weight basis, unless otherwise indicated.

What is claimed is:

1. A process for production of lower aliphatic saturated compounds having up to 4 carbon atoms selected from the group consisting of aldehydes, acids, esters, and ketones, which comprises contacting olefin selected from the group consisting of propylene and isobutylene with oxygen in the presence of a catalyst consisting essentially of molybdenum oxide and phosphoric acid and boric acid, said contacting being for oxidation of the said olefin to produce said saturated compound.

2. A process for production of lower aliphatic saturated compounds having up to 4 carbon atoms selected from the group consisting of aldehydes, acids, esters, and ketones, which comprises contacting olefin selected from the group consisting of propylene and isobutylene with oxygen in the presence of a catalyst consisting essentially of molybdenum oxide, phosphoric acid, boric acid, and bismuth oxide, said contacting being for oxidation of the said olefin to produce said saturated compound.

3. A process according to claim 1, wherein the temperature of said contacting is about 200–500° C.

4. A process according to claim 1, wherein the amount of phosphoric acid and boric acid is about 1–25% of the total catalyst.

5. A process according to claim 4, the mol proportion of boric acid to phosphoric acid being in the range of about 5:1 and 1:5.

6. A process for production of lower aliphatic saturated compounds having up to 4 carbon atoms selected from the group consisting of aldehydes, acids, esters, and ketones, which comprises contacting olefin selected from the group consisting of propylene and isobutylene with oxygen in the presence of a catalyst consisting essentially of catalyst support, molybdenum oxide, phosphoric acid, boric acid and bismuth oxide, activated while contained on said support by heating to above about 150° C., said contacting being for oxidation of said olefin to produce said saturated compound.

7. A process for production of lower aliphatic saturated compounds having up to 4 carbon atoms selected from the group consisting of aldehydes, acids, esters and ketones, which comprises contacting olefin selected from the group consisting of propylene and isobutylene with oxygen in the presence of a catalyst consisting essentially of catalyst support, molybdenum oxide, and phosphoric acid and boric acid activated while contained on said support by heating to above about 150° C., said contacting being for oxidation of the said olefin to produce said saturated compound.

8. A process according to claim 7, the support being selected from the group consisting of silica and alumina, the pressure of the contacting being in the range of about atmospheric —16 kgs. per cm.$^2$, the amount of phosphoric acid and boric acid being about 1–25% of the total catalyst, and the proportion of boric acid to phosphoric acid being in the range of about 5:1 and 1:5.

9. A process according to claim 7, wherein the temperature of said contacting is about 200–500° C.

10. A process according to claim 7, wherein the amount of phosphoric acid and boric acid is about 1–25% of the total catalyst.

11. A process according to claim 10, the mol proportion of boric acid to phosphoric acid being in the range of about 5:1 and 1:5.

References Cited by the Examiner

UNITED STATES PATENTS

| | | | |
|---|---|---|---|
| 2,232,610 | 2/1941 | Joshua et al. | 252—432 |
| 2,606,877 | 8/1952 | West | 252—432 |
| 2,938,001 | 5/1960 | deRosset | 252—432 |
| 3,029,288 | 4/1962 | Etherington | 260—604 |
| 3,057,915 | 10/1962 | Riemenschneider et al. | 260—533 |
| 3,065,264 | 11/1962 | Koch et al. | 260—533 |

FOREIGN PATENTS 744,401  1/1933  France.

LORRAINE A. WEINBERGER, *Primary Examiner.*

LEON ZITVER, *Examiner.*

G. P. D'ANGELO, I. R. PELLMAN,
*Assistant Examiners.*